United States Patent [19]

Fielder et al.

[11] Patent Number: 4,767,088

[45] Date of Patent: Aug. 30, 1988

[54] MULTISTATION BIRD FEEDER SUPPORT

[75] Inventors: Dennis C. Fielder, Middleburg Heights; Arthur J. Furman, Andover; Paul A. Miller, Independence, all of Ohio; Blair E. Rogers, Linesville, Pa.

[73] Assignee: Cardinal American Corporation, Cleveland, Ohio

[21] Appl. No.: 70,347

[22] Filed: Jul. 7, 1987

[51] Int. Cl.$^4$ ............................................. A01K 39/01
[52] U.S. Cl. .................................... 248/121; 211/205; 119/51 R; 119/63
[58] Field of Search ............... 248/121, 158, 159, 176, 248/156, 218.4, 219.2, 244; 108/149; 119/23, 51 R, 52 R, 63; 211/205, 207, 208, 196, 197; 403/346, 347, 207; 411/55, 531, 519, 520, 521, 913

[56] References Cited

U.S. PATENT DOCUMENTS

| | | | |
|---|---|---|---|
| 1,113,678 | 10/1914 | Oeschsle | 403/346 |
| 2,712,262 | 7/1955 | Knohl | 411/521 |
| 2,835,009 | 5/1958 | Balint | 411/520 |
| 2,887,988 | 5/1959 | Cottongim | 119/51 R |
| 3,062,494 | 11/1962 | French | 248/158 |
| 3,157,253 | 11/1964 | Vanko | 248/219.2 X |
| 3,515,098 | 6/1970 | Thurmond | 119/51 R |
| 3,734,301 | 5/1973 | Rastocny | 211/205 |
| 3,955,787 | 5/1976 | Brown | 211/196 X |
| 4,026,244 | 5/1977 | Salick | 119/51 R |
| 4,031,856 | 6/1977 | Chester | 119/51 R |
| 4,441,457 | 4/1984 | Sanford | 119/51 R |

FOREIGN PATENT DOCUMENTS

| | | | |
|---|---|---|---|
| 756832 | 3/1967 | Canada | 411/55 |
| 718488 | 3/1942 | Fed. Rep. of Germany | 411/531 |
| 885715 | 5/1940 | France . | |
| 2404139 | 5/1979 | France | 403/347 |
| 253777 | 11/1948 | Switzerland | 411/521 |
| 2127266 | 4/1984 | United Kingdom | 119/51 R |

Primary Examiner—J. Franklin Foss
Assistant Examiner—Robert A. Olson
Attorney, Agent, or Firm—Pearne, Gordon, McCoy & Granger

[57] ABSTRACT

A multistation bird feeder support is disclosed which may be inventoried and shipped in a disassembled, compact condition, and easily assembled by the user. The feeder provides a two-piece center pole adapted to be mounted at its lower end in the ground. The upper end of the center pole is provided with four longitudinally extending slots sized to receive flattened portions of two interfitting support beams and to maintain the support beams perpendicular to the center pole. A bird feeder or the like can be mounted on each end of each beam. A lock member is positioned in the upper end of the pole above the cross beams, and a bolt is threaded through the lock member into engagement with the upper surfaces of the beams to hold them in a perpendicular position and assist the beams in supporting end loads. A cap is mounted on the upper end of the center pole and provides a skirt extending around the lock member to prevent it from spreading the upper end of the pole. A squirrel guard is adjustably positioned along the length of the center pole by an elastic O-ring which can be rolled along the length of the pole to any desired location for the squirrel guard.

18 Claims, 2 Drawing Sheets

MULTISTATION BIRD FEEDER SUPPORT

BACKGROUND OF THE INVENTION

This invention relates generally to support structures, and more particularly to a novel and improved support structure for a plurality of bird feeders or the like.

Prior Art

Bird feeder supports, particularly for two or more bird feeders, are generally stored and shipped in a disassembled condition and are assembled by the user. Therefore, it is desirable to provide units that can be easily assembled without complicated connecting structures.

It is known to provide bird feeder supports which include a tubular pole anchored at its lower end in the ground and providing one or more cantileversupported arms mounted on the upper end of the pole and extending laterally therefrom. Such arms are arranged to support a bird feeder or the like at their outer ends. The inner ends are mounted at the upper end of the center pole. In such systems, each arm is separate and provides an inner end which extends down into the upper end of the pole to provide the mounting structure. With such cantilever mounting of the arms, the connection between the inner ends of the arms and the pole itself is subjected to substantial force couples, resulting in substantial stresses on the connection.

SUMMARY OF THE INVENTION

There are a number of important aspects of this invention. In accordance with one important aspect of the invention, a feeder support provides a beam or arm mounting structure which minimizes the stresses imposed upon the arm mounting structure. Further, the structure is arranged to permit low-cost manufacture, ease of assembly, and durability.

In the illustrated embodiment, the feeder support provides a center pole and lateral beams mounted at their center on the upper end of the pole. Because of the central mounting of the beams, each beam provides two arms extending laterally therefrom, and each arm is operable to support a bird feeder or the like. With such structure, the feeder at one end of a given beam tends to balance the feeder at the other end. Therefore, the force couples applied to the mounting structure are minimized.

In accordance with another aspect of this invention, two beams are provided extending perpendicularly to each other, and are structured to interfit at the location in which they are mounted on the pole. One beam is provided with a downwardly extending lateral notch, and the other beam is provided with an upwardly extending lateral notch. The two notches are sized to interfit so that the two beams interconnect with a crosslike structure. The depth of the two notches is selected so that the total depth of the notches equals the width of the beams at their intersection. Consequently, the two beams are at the same level and, in effect, extend along a single plane.

The two beams are mounted within four longitudinally extending notches formed in the tubular upper end of the center pole. Because the beams are contained within a single plane, the depth of such four notches is the same, and they extend to notch end surfaces which are aligned. Consequently, the tooling required to form the longitudinally extending notches in the center support pole is simplified. When assembled, the notch end surfaces cooperate to engage each of the two beams at two spaced locations, with one on each side of the intersection of the beam. This provides a stable mounting structure for the beams.

In accordance with another aspect of this invention, the downwardly extending notch formed in one of the beams has a depth less than the depth of the upwardly extending notch in the other of the beams. Thus, the portion of the beam extending through the lower side of the intersection has a greater width, and therefore provides greater strength at the intersection to support the load of the associated bird feeders mounted on the ends thereof. On the other hand, the portion of the other beam extending along the upper side of the intersection past its notch has a reduced width. This reduced width of the connecting portion of the beam, however, does not significantly reduce the ability of such beam to support end loads, since the edges of such beam along the notch portion thereof press inwardly against the sides of the lower beam and provide adequate strength for the support of bird feeders mounted at its ends.

In accordance with still another aspect of this invention, a structurally simple, easily assembled clamping system is provided at the upper end of the center pole to further stabilize the beams. Such clamping system includes a generally conical lock member proportioned to fit downwardly into the upper end of the center pole above the intersection of the beams, and which is shaped to allow easy insertion but, after installation, provides self-locking to prevent its upward movement relative to the center pole. Such locking member is designed to accept a threaded hex head bolt which engages and clamps the upper side of the intersection.

Since the locking member is located within a portion of the center pole having longitudinal notches extending therealong, a clamping force of the bolt operates to produce a radial force on such notched portion of the center pole, tending to spread the separate portions between the notches. Therefore, a cup-shaped cap member is provided having a cylindrical skirt extending down along the exterior surface of the notched portion of the pole to absorb the radial forces applied by the locking member and to prevent spreading of the notched portion of the upper end of the center pole.

The bolt that is threaded down through the locking portion and the cap is tightened against the upper surface of the intersection. This clamping bolt performs several functions. First, it clamps the beams down against the lower end surface of the pole notches to maintain tight engagement between such end surfaces and the associated beams. Therefore, any imbalance which may occur on a given beam because of the difference in weight of the feeders supported thereby cannot cause tipping of the beams with respect to the pole. Also, such clamping bolt applies a downward force to the intersection resisting the force couples being transmitted along the beams past the intersection, thereby augmenting the strength of the beams themselves in their ability to support end loads.

It is another important aspect of this invention to provide a novel and improved structure for supporting a squirrel guard at any location along the length of the center pole. In the illustrated embodiment, a squirrel guard is provided with a central opening proportioned to fit around the center pole with a loose fit. An O-ring having a thickness greater than the clearance between the squirrel guard opening and the center pole is moved along the center pole to the location desired for the squirrel guard. The squirrel guard is positioned against the O-ring and is positioned along the length of the center pole thereby. If a squirrel or other animal climbs the pole and attempts to climb around the squirrel guard, the squirrel guard tips, due to the clearance, and the squirrel is inhibited in its attempt to climb up along the pole past the squirrel guard. This extremely simple, adjustable, low-cost squirrel guard mounting system provides an effective, reliable system.

These and other aspects of this invention are illustrated in the accompanying drawings, and are more fully described in the following specification.

DETAILED DESCRIPTION OF THE DRAWINGS

Figure 1:
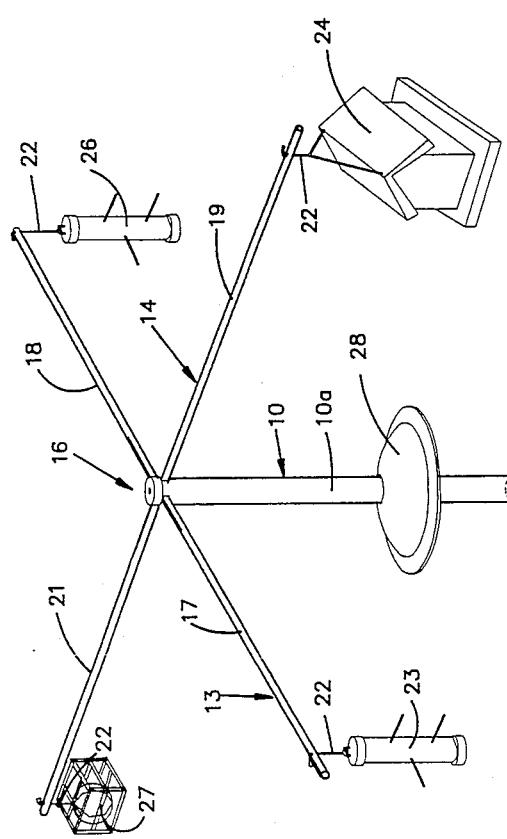
FIG. 1 is a perspective view of an assembled bird feeder support system in accordance with the preferred embodiments of this invention, illustrating such system supporting four separate and spaced bird feeders.

FIG. 1 illustrates a preferred embodiment of the bird feeder support in accordance with the present invention. Such embodiment includes a tubular central support pole 10, preferably formed of two or more sections 10a and 10b, which can be shipped disassembled. The two sections are preferably formed of metal tubes providing a typical telescoping connection 11 so that they can be assembled into a unitary pole structure during the assembly of the unit. When assembled, the lower end of the support pole 10 is preferably anchored in cement poured into a hole in the ground. A sleeve or socket 9 is preferably cast in the cement to provide an opening for the lower end of the pole so that the pole can be removably installed in a secure manner.

Mounted at the upper end of the center pole 10 are two laterally extending, elongated beams 13 and 14. The beams 13 and 14 are mounted at their centers on the pole by a mounting structure 16, so that each beam provides two laterally extending arm portions 17, 18, 19, and 21. Mounted adjacent to the ends of the arm portions by bent wires 22 are four bird feeder units 23, 24, 26, and 27. Such feeders can be of any conventional type, and, if desired, four different types of feeders may be selected, each intended to attract a given type or group of birds. Because the feeders are substantially separated, birds feeding on one feeder do not prevent other birds form feeding on others of the feeders.

Positioned on the pole 10 at any desired location along its length is a squirrel guard 28 to prevent squirrels or other ground animals from climbing the pole and reaching the individual feeders.

Figure 2:
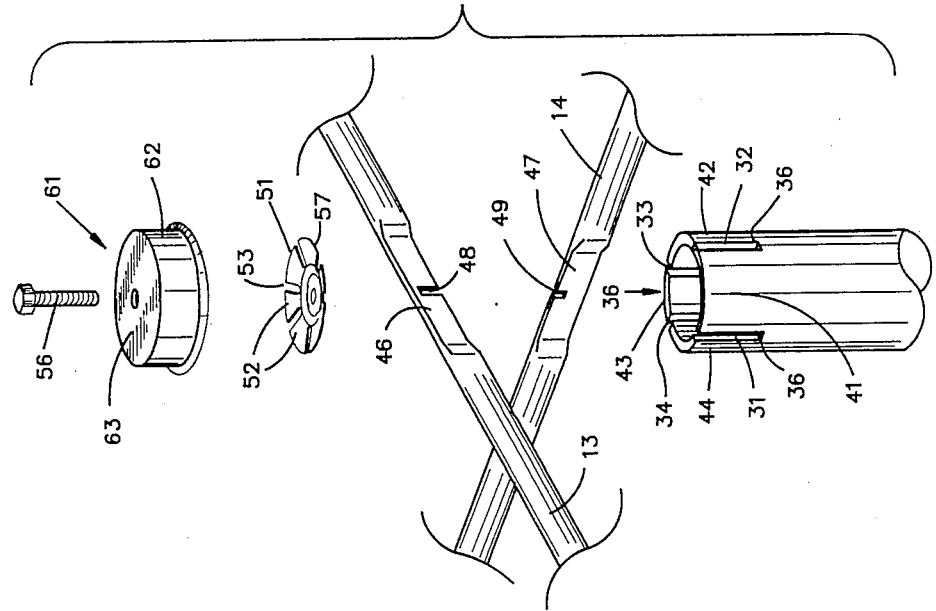
FIG. 2 is an exploded view of the elements of the mounting system for mounting the cross beams on the center pole at enlarged scale.

FIG. 2 is an exploded view of the mounting structure for mounting the two beams 13 and 14 on the upper end of the center pole 10. Such mounting structure includes four longitudinally extending slots 31, 32, 33, and 34 formed in the tubular wall of the center pole 10 extending from the upper end 36 thereof at symmetrically spaced locations around the pole periphery. The slots 31 through 34 have an equal length, so each slot provides an end surface 36 which is aligned along the length of the pole and provides support for the arms, as discussed in detail below.

Because there are four slots formed in the end of the center support 10, there are four separate, longitudinally extending portions 41, 42, 43, and 44 therebetween. Because the longitudinally extending slots 31 through 34 are equal in size and length and are uniformly positioned around the periphery of the tube, relatively simple tooling can be provided to form such slots.

The beams 13 and 14 are preferably metal tubes provided with flattened portions 46 and 47 extending along the central portion thereof. At the center of the beam 13, the flattened portion 46 is provided with an upwardly extending lateral notch 48 having a width sized to closely fit the flattened portion 47 of the beam 14. For the reasons discussed in detail below, the upwardly extending notch is preferably provided with a height equal to about two-thirds the height of the flattened portion 46.

The flattened portion 47 of the other beam 14 is formed with a downwardly extending notch 49 having a width sized to closely fit the width of the flattened portion 46 and a depth equal to about one-third of the height of the flattened portion 47. Therefore, the two notches 48 and 49 have a total depth equal to the width of the flattened portions 46 and 47, and interfit when assembled to connect the two beams 13 and 14 so that they extend perpendicular to each other and are at the same height. In effect, the two beams, when assembled, extend along the same horizontal plane.

The mounting structure also includes a locking member 51 formed of hardened spring steel provided with a body having an upwardly open, shallow, conical shape. Such body provides inclined leaf portions 52 separated by radial cuts 53 which terminate at a location spaced from the center so that the individual leaves are joined together adjacent to the center of the body of the locking member 51. The center of the locking portion is formed with a central opening shaped and sized to receive a hex head clamping bolt 56. Such locking members are commercially available and are sized to be pressed into a tube with an interference fit to lock with the inner surface of a tube.

When such locking members are pressed into a tubular member, the leaves 52 are deformed radially inward by the interference fit and the outer edges 57 of the leaves engage the inner wall of the tubular member. When a clamping bolt 56 is threaded downwardly to produce an upward force on the center portion of the locking member, such leaves attempt to deform to a more flattened condition, causing the outer edges 57 to bite into such inner wall and anchor the locking member against movement.

The mounting structure also includes an end cap 61 providing a cylindrical skirt 62 sized to closely fit the exterior of the longitudinal portions 41 through 44 and hold them against spreading deformation when the clamping bolt 56 is tightened. The end cap is also provided with an apertured end wall 63 through which the clamping bolt 56 extends when the unit is assembled.

The assembly of the arms 13 and 14 at the upper end of the center pole is accomplished as follows. First, the two beams are interconnected by interfitting the grooves 48 and 49. This positions the two beams 13 and 14 perpendicular to each other, with the lower surfaces of the flattened portions 46 and 47 contained within a single plane, and provides a cross-like structure in which the two beams extend perpendicular to each other.

The assembled beams are then moved axially into the grooves 31 through 34 until the lower edges of the flattened portions engage the groove end walls 36. As long as such engagement is maintained between the lower surfaces of the flattened portions and the end walls of the slots, the two beams extend perpendicular to each other and also perpendicular to the center pole 10.

After the two interfitted beams are positioned in the upper end of the pole, the locking member 51 is pressed down into the end of the pole and locks in position above the intersecting beam. The cap 61 is then installed to prevent the longitudinal portions 41 through 44 from spreading and the clamping bolt 56 is inserted through the apertured end wall of the cap and threaded into the locking member 51. The clamping screw is then threaded down into tight engagement with the top wall of the flattened portion 46 of the beam 13. This functions through the interfitting connection to press the two beams down into tight engagement with the slot end walls 36 to maintain such engagement even if the weight of the bird feeders 23, 24, 26, and 27 is not equal. Therefore, any imbalance imposed on the beams does not cause tipping of the beams with respect to the center pole.

Figure 3:
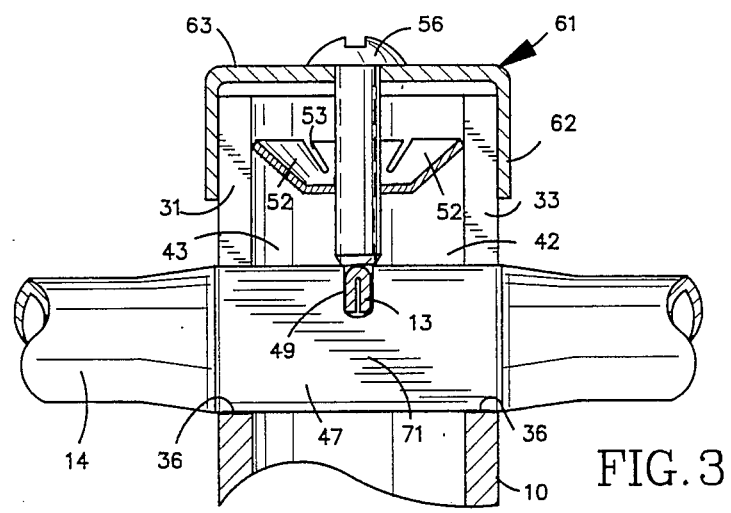
FIG. 3 is a further enlarged, fragmentary cross section of the cross beam mounting system in an assembled condition.
Figure 4:
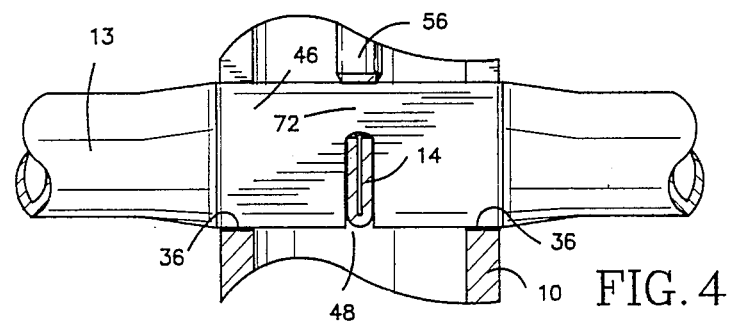
FIG. 4 is a fragmentary cross section taken of FIG. 3.

As best illustrated in FIGS. 3 and 4, the through portion 71 of the flattened portion 47 of the beam 14 extending past the downwardly extending notch 49 is wider than the corresponding through portion 72 of the beam 13. This is a preferred structural arrangement, since loads applied to the ends of the beam 14 tend to bend the beam downwardly at its ends and to open the groove 49, whereas, the downward forces on the ends of the beam 13, which also tend to bend the ends of the beam 13 down, tend to close the notch 48. In the case of the beam 13, however, the engagement of the sides of the notch 48 with the sides of the through portion 71 resists such bending and assists in resisting such downward force. On the other hand, because the downward forces tend to open the notch 49, such cooperating support is not provided for the beam 14 and a wider through portion 71 is required for such beam to resist downward movement of the ends of the beam 14.

The downward force on the upper edge of the through portion 72 provided by the screw 56 also tends to resist downward movement of the ends of the beam 13 and, through the interfitting engagement, also resists downward movement of the ends of the beam 14. therefore, the clamping screw 56 performs two functions: it maintains the beams perpendicular to the center pole 10, even when imbalances occur on a given beam, and it strengthens the beams against such end loading.

Because the cylindrical skirt 62 of the end cap encompasses the entire upper end of the center pole, the radially directed forces created by the clamping in the locking member 51 are resisted by the hoop strength of the cylindrical skirt 62 and the locking member functions properly without causing significant spreading of the longitudinal portions 41 through 44, even when high clamping forces are involved.

With this simple, low-cost structure, the beams are firmly and rigidly mounted on the upper end of the center pole, and are supported by an easily assembled structure. Further, since the beams are not cantilever-supported on the center pole, the force couples produced by the weight of the feeders, to a large extent, are transmitted through the through portions 71 and 72 and need not be absorbed directly in the mounting structure. Still further, the two feeders mounted on each end of a given beam tend to balance each other and reduce the stresses in the mounting structure 16.

Figure 5:
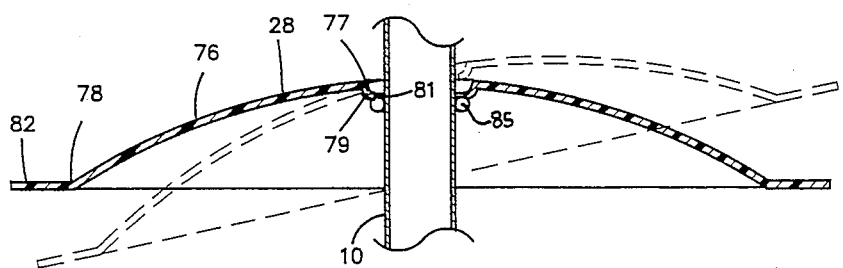
FIG. 5 is an enlarged section of the squirrel guard and its mounting on the center pole, illustrating in phantom the manner in which the squirrel guard tips when an animal attempts to climb past it.
Figure 6:
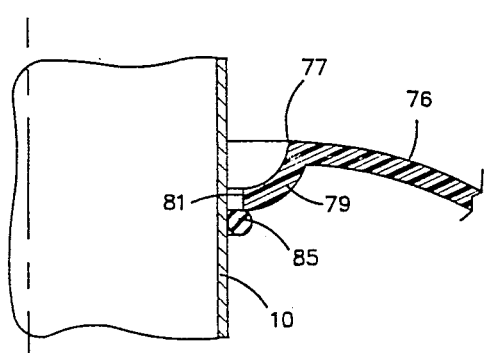
FIG. 6 is an enlarged, fragmentary section of the mounting of the squirrel guard.

FIGS. 5 and 6 illustrate the preferred structure for mounting the squirrel guard on the center pole. With this structure, the squirrel guard 28 can be mounted at any desired location along the length of the center pole.

The squirrel guard 28 is preferably molded of a suitable plastic material or formed of a suitable sheet metal, and is provided with a generally spherical portion 76 extending from the point 77 to the point 78. Inwardly of the point 77, a re-entrant inner portion 79 is formed with a reverse curvature extending to a central opening 81 sized to fit the center pole 10 with a loose fit.

This re-entrant portion 79 provides added stiffness to the squirrel guard. Similarly, the periphery of the squirrel guard beyond the point 78 is formed with a flat flange portion 82 which provides peripheral stiffening of the squirrel guard 28. Positioned below the squirrel guard 28 is an O-ring 85 which positions the squirrel guard along the length of the support pole. Preferably, the O-ring 85 is a simple commercial O-ring sized to have an unstressed diameter less than the diameter of the pole.

During assembly, the O-ring 85 is stretched and positioned around the pole 10. It is then rolled along the pole to the location at which it is desired to position the squirrel guard. The squirrel guard then is moved along the pole into engagement with the upper side of the O-ring 85. Because the center aperture 81 is provided with clearance, any load applied to the squirrel guard tends to cause the O-ring 85 to roll inwardly and engage the surface of the center pole with increased force. Consequently, such a downward force does not cause the O-ring 85 to slide lengthwise of the pole, and it functions to maintain the squirrel guard in its adjusted position even when loads are applied thereto. The clearance further permits the squirrel guard to tip when a downward force is applied anywhere along its periphery, as illustrated in phantom. Consequently, a squirrel or any other ground animal attempting to climb around the squirrel guard tends to be thrown off the guard and is therefore prevented from passing the guard and continuing up the pole to the feeder. The surface of the squirrel guard is smooth and difficult even for a squirrel to grip when attempting to bypass the guard.

A very simple squirrel guard structure is combined with a simple O-ring to provide a reliable, easily assembled structure for positioning the squirrel guard at any desired location along the length of the pole.

Figure 7:
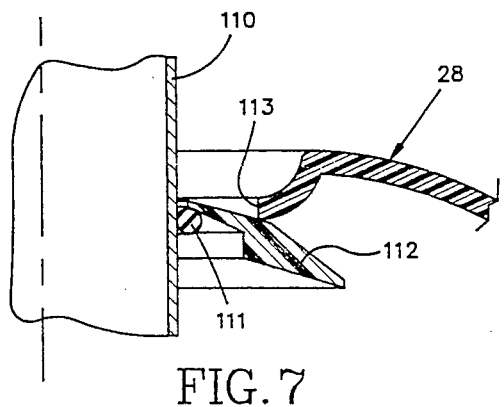
FIG. 7 illustrates a modified squirrel guard support adapted to be used on a smaller diameter pole.

FIG. 7 illustrates a modified structure permitting the squirrel guard 28 to be used with a smaller diameter pole 110. In such modified structure, an O-ring 111 is again stretched around the pole 110. An adapter ring 112 is provided with an opening 113 sized to fit the pole 110 with clearance and provides an upper surface on which the squirrel guard 28 rests. Because the inner opening 81 provides greater clearance with the pole 110, the squirrel guard 28 can tip an even greater amount in this modified form.

With the present invention, a simple, low-cost, reliable, easy assembled structure is provided for supporting one or more beams, each of which can be used to support at least two feeders at spaced locations on opposite sides of the center pole Although the preferred embodiments of this invention have been shown and described, it should be understood that various modifications and rearrangements of the parts may be resorted to without departing from the scope of the invention as disclosed and claimed herein.

What is claimed is:

1. A support for a plurality of bird feeders comprising a pole one end of which is adapted to be anchored in the ground, the other end of said pole including a hollow slotted portion providing at least two diametrically opposed longitudinally extending slots extending from the other end of said pole to slot end walls, a first elongated beam adapted to be positioned at its center in said slots against said slot end walls and provide oppositely extending beam arms extending substantially perpendicular to said pole, and on which bird feeders can be supported, and fastener means providing:
    (a) a first member operable to engage and grip the inner wall of said slotted portion and prevent movement toward said other end;
    (b) a cylindrical strap adapted to engage the outer surface of said slotted portion and preventing spreading thereof by said first member; and
    (c) a threaded fastener adapted to be threaded through said firsts member into tight engagement with said beam on the side thereof opposite said slot end walls to maintain said beam against said slot end walls and resist bending of said beam under loads applied by bird feeders.

2. A support for a plurality of bird feeders as set forth in claim 1, wherein said slotted portion provides at least two additional diametrically opposed slots each extending to a slot end wall, and a second elongated beam is provided adapted to be positioned at its center in said two additional slots to extend at an angle relative to said first beam with said beam engaging each other in said hollow slotted portion, said threaded fastener being adapted to maintain both beams against the associated slot end walls.

3. A support fore a plurality of bird feeders as set forth in claim 2, wherein said beams are tubes provided with flattened portions at their centers having a reduced width, and said reduced width of said flattened portions being substantially equal to the width of said slots.

4. A support for a plurality of bird feeders as set forth in claim 3, wherein said flattened portions are provided with lateral notches and are adapted to interfit into a subassembly in which said beams are substantially coplanar and extend substantially perpendicular to each other.

5. A support for a plurality of bird feeders as set forth in claim 4, wherein the length of said lateral notch in one beam is about twice the length of said lateral notch in the other beam.

6. A support for a plurality of bird feeders as set forth in claim 5, wherein all of said slot end walls are contained substantially in a plane perpendicular to the length of said pole.

7. A support for a plurality of bird feeders as set forth in claim 6, wherein squirrel guard means are provided which are adapted to be mounted on said pole at substantially any point along the length thereof.

8. A support for a plurality of bird feeders as set forth in claim 7, wherein said squirrel guard means includes a generally disc-shaped squirrel guard formed with a central opening therein sized to fit around said pole with clearance, and an elastic band sized to fit on said pole when stretched from its unstressed condition.

9. A support for a plurality of bird feeders as set forth in claim 8, wherein said elastic band is an O-ring adapted to be rolled along said pole to the position selected for said squirrel guard.

10. A support for a plurality of bird feeders as set forth in claim 1, wherein squirrel guard means are provided which are adapted to be mounted on said pole at substantially any point along the length thereof.

11. A support for a plurality of bird feeders as set forth in claim 10, wherein said squirrel guard means includes a generally disc-shaped squirrel guard formed with a central opening therein sized to fit around said pole with clearance, and an elastic band sized to fit on said pole when stretched from its unstressed condition.

12. A support for a plurality of bird feeders as set forth in claim 11, wherein said elastic band is an O-ring adapted to be rolled along said pole to the position selected for said squirrel guard.

13. A support for a plurality of bird feeders comprising a pole, one end of which is anchored in the ground, the other end of said pole including a hollow slotted portion providing at least two pairs of diametrically opposed longitudinally extending slots circumferentially spaced from each other around the periphery of said slotted portion, said slots extending to slot end surfaces substantially contained within a plane extending perpendicular to the axis of said pole, at least two elongated beams interfitting at their center and extending substantially coplanar from said pole, said beams each being positioned within one pair of said diametrically opposed slots engaging a slot end surface on each side of said pole, and clamping means clamping said beams against the associated slot end walls, each beam being adapted to support a bird feeder or the like at each end thereof, said clamping means including a locked member positioned in said slotted portion above said beams and locked against longitudinal movement with respect to said slotted portion, a threaded fastener threaded through said locked member into clamping engagement with said beams, and a cylindrical band extending around said slotted portion aligned with said locking member preventing said locking member from causing spreading of said slotted portions.

14. A support for a plurality of bird feeders as set forth in claim 13, wherein said beams are tubes flattened at their centers, said flattened portion of one of said beams providing an upwardly open lateral notch having a first length, said flattened portion of the other of said beams having a downwardly open lateral notch having a length about twice said first length.

15. A support for a plurality of bird feeders as set forth in claim 13, wherein an elastic band is positioned on said pole at a location spaced from said slotted end, and a disc-shaped squirrel guard is provided with a central opening loosely fitting said pole, said disc-shaped squirrel guard being located against the upper side of said elastic band.

16. A support for a plurality of bird feeders as set forth in claim 15, wherein said elastic band is an O-ring and is movable along the length of said pole to adjust the position of said squirrel guard.

17. A bird feeder support comprising a pole, an elastic O-ring positioned on said pole intermediate its ends, said O-ring being stretched from its unstressed condition when positioned on said pole, and a disc-shaped squirrel guard formed with a central opening therein loosely fitting said pole supported by said O-ring, adjustment of said O-ring along the length of said pole providing adjustment of the position of said squirrel guard along the length of said pole, said squirrel guard being movable from a normal substantially horizontal position when a downward force is applied thereto at the periphery thereof, said squirrel guard providing a generally spherical portion extending from a location substantially adjacent to said pole to an outer spherical portion edge, said squirrel guard providing a planar flange extending from said outer spherical portion edge.

18. A support for bird feeders as set forth in claim 17, wherein an adapter ring providing a central opening sized to receive said pole with a first clearance rests on said O-ring, and said central opening of said squirrel guard has a diameter greater than said central opening of said adapter ring, said squirrel guard resting on said adapter ring.

* * * * *